(12) United States Patent
Clark et al.

(10) Patent No.: US 12,541,909 B2
(45) Date of Patent: *Feb. 3, 2026

(54) MULTIPLE PRECISION LEVEL INTERSECTION TESTING IN A RAY TRACING SYSTEM

(71) Applicant: Imagination Technologies Limited, Kings Langley (GB)

(72) Inventors: Gregory Clark, Hemel Hempstead (GB); Steven J. Clohset, San Francisco, CA (US); Luke T. Peterson, San Francisco, CA (US); Naser Sedaghati, Columbus, OH (US); Ali Rabbani, Nottingham (GB)

(73) Assignee: Imagination Technologies Limited, Kings Langley (GB)

(*) Notice: Subject to any disclaimer, the term of this patent is extended or adjusted under 35 U.S.C. 154(b) by 890 days.

This patent is subject to a terminal disclaimer.

(21) Appl. No.: 17/191,605

(22) Filed: Mar. 3, 2021

(65) Prior Publication Data

US 2021/0192829 A1 Jun. 24, 2021

Related U.S. Application Data

(63) Continuation of application No. 16/684,896, filed on Nov. 15, 2019, now Pat. No. 10,970,914.

(51) Int. Cl.
  *G06T 15/06* (2011.01)
  *G06T 11/20* (2006.01)
  *G06T 15/00* (2011.01)

(52) U.S. Cl.
  CPC .............. *G06T 15/06* (2013.01); *G06T 11/20* (2013.01); *G06T 15/005* (2013.01); *G06T 2210/12* (2013.01)

(58) Field of Classification Search
  CPC ....... G06T 15/06; G06T 15/005; G06T 11/20; G06T 2210/12; G06T 15/80;
  (Continued)

(56) References Cited

U.S. PATENT DOCUMENTS

2005/0017971 A1  1/2005  Ard
2005/0179686 A1  8/2005  Christensen et al.
(Continued)

FOREIGN PATENT DOCUMENTS

CN  103942825 A  7/2014
CN  104112291 A  10/2014
(Continued)

OTHER PUBLICATIONS

Dammertz et al; "Improving Ray Tracing Precision by Object Space Intersection Computation"; IEEE Symposium on Interactive Ray Tracing; 2006; pp. 25-31.
(Continued)

*Primary Examiner* — Xilin Guo
(74) *Attorney, Agent, or Firm* — Potomac Law Group, PLLC; Vincent M DeLuca

(57) ABSTRACT

A ray-tracing system for performing intersection testing includes a tester module for testing rays for intersection with a volume, the tester module receiving a packet of one or more rays to be tested for intersection with the volume. A first set of one or more testers performs intersection testing at a first level of precision to provide intersection testing results, wherein for a first type of the intersection testing result from the first set of one or more testers intersection testing does not need to be reperformed at a second level of precision greater than the first level of precision, and for a second type of the intersection testing result from the first set of one or more testers intersection testing is to be reperformed at the second level of precision; and a second set of (Continued)

one or more testers configured to perform intersection testing at the second level of precision. The tester module allocates a ray from a received packet to one of the first set of testers for intersection testing at the first level of precision; identifies the type of an intersection testing result for the ray provided by one of the first set of testers to determine whether intersection testing for the ray is to be reperformed at the second level of precision. If it is determined that intersection testing for the ray is to be reperformed at the second level of precision, the ray is allocated to one of the second set of testers for intersection testing at the second level of precision.

19 Claims, 6 Drawing Sheets

(58) Field of Classification Search
CPC ....... G06T 2210/21; G06T 15/40; G06T 1/20; G06T 15/08; G06T 15/50
See application file for complete search history.

(56) References Cited

U.S. PATENT DOCUMENTS

| 2012/0133654 | A1* | 5/2012 | Redgrave | G06F 8/4442 345/522 |
| 2017/0061674 | A1 | 3/2017 | Lee et al. | |
| 2017/0109462 | A1 | 4/2017 | Palka et al. | |
| 2018/0365879 | A1 | 12/2018 | Peterson et al. | |
| 2019/0057544 | A1 | 2/2019 | LeCocq et al. | |
| 2020/0051314 | A1* | 2/2020 | Laine | G06T 15/005 |
| 2021/0124581 | A1* | 4/2021 | Heinecke | G06F 9/3818 |

FOREIGN PATENT DOCUMENTS

| CN | 107111890 A | 8/2017 |
| CN | 109087384 A | 12/2018 |
| CN | 109255828 A | 1/2019 |
| CN | 109643461 A | 4/2019 |
| GB | 2566127 A | 3/2019 |

OTHER PUBLICATIONS

Keely; "Reduced Precision for Hardware Ray Tracing in GPUs"; Eurographics/ACM Siggraph Symposium of High Performance Graphics; 2014; pp. 29-40.

Mahovsky; "The University of Calgary Ray Tracing with Reduced-Precision Bounding Volume Hierarchies"; URL: https://pages.cpsc.ucalgary.ca/-brosz/theses/PhD%20Thesis%20-%202005%20-%20Jeffrey%20Mahovsky%22-%  %20Ray%20Tracing%20with%20Reduced-Precision%20Bounding%20Volume%20Hierarchies.pdf; 2005; pp. 1-206.

* cited by examiner

MULTIPLE PRECISION LEVEL INTERSECTION TESTING IN A RAY TRACING SYSTEM

CROSS-REFERENCE TO RELATED APPLICATIONS AND CLAIM OF PRIORITY

This application is a continuation under 35 U.S.C. 120 of copending application Ser. No. 16/684,896 filed Nov. 15, 2019.

FIELD

The present disclosure is directed to techniques of ray tracing in which rays are intersection tested against bounding volumes.

BACKGROUND

Ray tracing is a computational rendering technique for generating an image of a scene (e.g. a 3D scene) by tracing paths of light ('rays') from the viewpoint of a camera through the scene. Each ray is modelled as originating from the camera and passing through a pixel into the scene. As a ray traverses the scene it may intersect objects within the scene. The interaction between a ray and an object it intersects can be modelled to create realistic visual effects. For example, in response to determining an intersection of a ray with an object, a shader program (i.e. a portion of computer code) may be executed in respect of the intersection. A programmer can write the shader program to define how the system reacts to the intersection which may, for example cause one or more secondary rays to be emitted into the scene, e.g. to represent a reflection of the ray off the intersected object or a refraction of the ray through the object (e.g. if the object is transparent or translucent). As another example, the shader program could cause one or more rays to be emitted into the scene for the purposes of determining whether the object is in shadow at the intersection point. The result of executing the shader program (and processing the relevant secondary rays) can be the calculation of a colour value for the pixel the ray passed through.

In order to reduce the number of intersection tests that need to be performed, ray tracing systems can generate acceleration structures, wherein each node of an acceleration structure represents a region within the scene. Acceleration structures are often hierarchical (e.g. having a tree structure) such that they include multiple levels of nodes, wherein nodes near the top of the acceleration structure represent relatively large regions in the scene (e.g. the root node may represent the whole scene), and nodes near the bottom of the acceleration structure represent relatively small regions in the scene. Leaf nodes of the acceleration structure represent regions bounding one or more objects in the scene. The acceleration structure can have different structures in different examples, e.g. a grid structure, an octree structure, a space partitioning structure (e.g. a k-d tree) or a bounding volume hierarchy. The nodes can represent suitable shapes or regions in the scene (e.g. boxes or spheres). In some examples the nodes represent axis-aligned bounding boxes (AABBs) in the scene.

Intersection testing can then be performed for a ray in a recursive manner using the acceleration structure by first testing the ray for intersection with the root node of the acceleration structure. If the ray is found to intersect a parent node (e.g. the root node), testing can then proceed to the child nodes of that parent. In contrast, if the ray is found not to intersect a parent node, intersection testing of the child nodes of that parent node can be avoided, saving computational effort. If a ray is found to intersect with a leaf node then it can be tested against the objects within the region represented by the leaf node to thereby determine which object(s) the ray intersects with. If more than one intersection is found for a ray then the closest of the intersection points to the ray's origin (i.e. the first intersection that the ray encounters in the scene) can be identified and the ray is determined to intersect at this identified closest intersection. The use of an acceleration structure (rather than testing rays directly with objects in the scene) reduces the number of intersection tests that need to be performed, and simplifies the intersection tests. The intersection tests are simpler because the nodes of the acceleration structure represent basic shapes (e.g. axis-aligned bounding boxes or spheres) for which intersection tests are simpler than for more complex object shapes, e.g. defined in terms of triangular primitives for which the orientation is not predetermined.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

There is provided a ray-tracing system configured to perform intersection testing, comprising:
   a tester module for testing rays for intersection with a volume, the tester module being configured to receive a packet of one or more rays to be tested for intersection with the volume, wherein the tester module comprises:
      a first set of one or more testers configured to perform intersection testing at a first level of precision to provide intersection testing results, wherein for a first type of the intersection testing result from the first set of one or more testers intersection testing does not need to be reperformed at a second level of precision greater than the first level of precision, and for a second type of the intersection testing result from the first set of one or more testers intersection testing is to be reperformed at the second level of precision; and
      a second set of one or more testers configured to perform intersection testing at the second level of precision;
   wherein the tester module is configured to:
      allocate a ray from a received packet to one of the first set of testers for intersection testing at the first level of precision;
      identify the type of an intersection testing result for the ray provided by said one of the first set of testers to determine whether intersection testing for the ray is to be reperformed at the second level of precision; and
      if it is determined that intersection testing for the ray is to be reperformed at the second level of precision, allocate the ray to one of the second set of testers for intersection testing at the second level of precision.

The first type of the intersection testing result may be a miss result, wherein the second type of the intersection testing result is a hit result.

The first type of the intersection testing result may be a hit result, wherein the second type of the intersection testing result is a miss result.

For a third type of the intersection testing result from the first set of one or more testers intersection testing may not be reperformed at the second level of precision, wherein the first type is a miss result, the third type is a confident hit result and the second type is a may be hit result.

Each of the first set of testers may be configured to determine whether an intersection test is to be reperformed for a hit result based on how close to being a miss result the hit result was.

Each of the first set of testers may be configured to determine how close to being a miss result a hit result was by determining, for each silhouette edge of the volume, a minimum distance between the ray and the silhouette edge of the volume.

Each of the first set of testers may be configured to determine how close to being a miss result a hit result was by determining, for each silhouette edge of the volume, a difference in the distances from the ray origin to the two intersection points where the ray intersects with two planes defining that silhouette edge.

The tester module may be configured to process the result of the intersection test at the first level of bit precision if that intersection test does not indicate that the intersection testing is to be reperformed at the second level of precision.

The ray tracing system may further comprise a scheduler configured to receive intersection testing results from the tester module and schedule rays into packets for intersection testing with volumes corresponding to nodes of a hierarchical acceleration structure The scheduler may be configured to:
if the result of the intersection testing for a ray indicates that the ray intersects a volume corresponding to a parent node in the hierarchical acceleration structure, schedule the ray for intersection testing with one or more volumes corresponding to one or more nodes which are children of the intersected parent node in the hierarchical acceleration structure.

The scheduler may be configured to:
if the result of the intersection testing for a ray indicates that the ray does not intersect a volume corresponding to a parent node in the hierarchical acceleration structure, not schedule the ray for intersection testing with one or more volumes corresponding to one or more nodes which are children of the intersected parent node in the hierarchical acceleration structure.

The tester module may be configured to process the result of the intersection test at the second level of precision for each outcome of that intersection test.

The volume is an axis-aligned bounding box.

The first set of one or more testers and the second set of one or more testers may be configured to perform intersection testing by performing a plurality of edge tests that each determine which side of a respective edge defining part of a silhouette of the volume the ray passes on.

The first and second sets of testers may be configured to perform intersection testing using floating point arithmetic.

Floating point numbers at the first level of precision may have an equal number of exponent bits to floating point numbers at the second level of precision and floating point numbers at the first level of precision may have fewer mantissa bits than the floating point numbers at the second level of precision.

The floating point numbers at the first level of precision may have 16 bits comprising: 1 sign bit, 8 exponent bits and 7 mantissa bits and the floating point numbers at the second level of precision may have 32 bits comprising: 1 sign bit, 8 exponent bits and 23 mantissa bits.

The tester module may be configured to convert values from the second level of precision to the first level of precision for use in the first set of one or more testers, wherein converting the values comprises rounding the mantissa values in accordance with rounding modes which are determined such that the intersection testing results provided by the first set of one or more testers are conservative.

The ray tracing system may further comprise a third set of one or more testers configured to perform intersection testing at a third level of precision, wherein the third level of precision is greater than the second level of precision.

The ray tracing system may be embodied in hardware on an integrated circuit.

There is provided a computer-implemented method of performing intersection testing in a ray tracing system, the method comprising:
receiving a packet of one or more rays to test for intersection with a volume;
performing intersection testing on a ray from the received packet at a first level of precision to attempt to determine whether or not the ray intersects the volume;
based on a type of the intersection testing result from said performing intersection testing on the ray at the first level of precision, determining whether intersection testing is to be reperformed for the ray at a second level of precision, wherein the second level of precision is greater than the first level of precision; and
if it is determined that intersection testing is to be reperformed for the ray at the second level of precision, performing further testing of the ray at the second level of precision.

The determining whether intersection testing is to be reperformed for the ray at a second level of precision may comprise determining whether an intersection test is to be reperformed for a hit result based on how close to being a miss result the hit result was.

The method may further comprise determining how close to being a miss result a hit result was by determining, for each silhouette edge of the volume, a difference in the distances from the ray origin to the two intersection points where the ray intersects with two planes defining that silhouette edge.

The ray tracing system may be embodied in hardware on an integrated circuit. There may be provided a method of manufacturing, at an integrated circuit manufacturing system, the ray tracing system. There may be provided an integrated circuit definition dataset that, when processed in an integrated circuit manufacturing system, configures the system to manufacture the ray tracing system. There may be provided a non-transitory computer readable storage medium having stored thereon a computer readable description of an integrated circuit that, when processed in an integrated circuit manufacturing system, causes the integrated circuit manufacturing system to manufacture the ray tracing system.

There may be provided an integrated circuit manufacturing system comprising:
a non-transitory computer readable storage medium having stored thereon a computer readable integrated circuit description that describes the ray tracing system;
a layout processing system configured to process the integrated circuit description so as to generate a circuit layout description of an integrated circuit embodying the ray tracing system; and
an integrated circuit generation system configured to manufacture the ray tracing system according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

BRIEF DESCRIPTION OF THE DRAWINGS

The present invention is described by way of example with reference to the accompanying drawings. In the drawings.

Like reference numerals will be used herein to denote like components.

DETAILED DESCRIPTION

Figure 1:
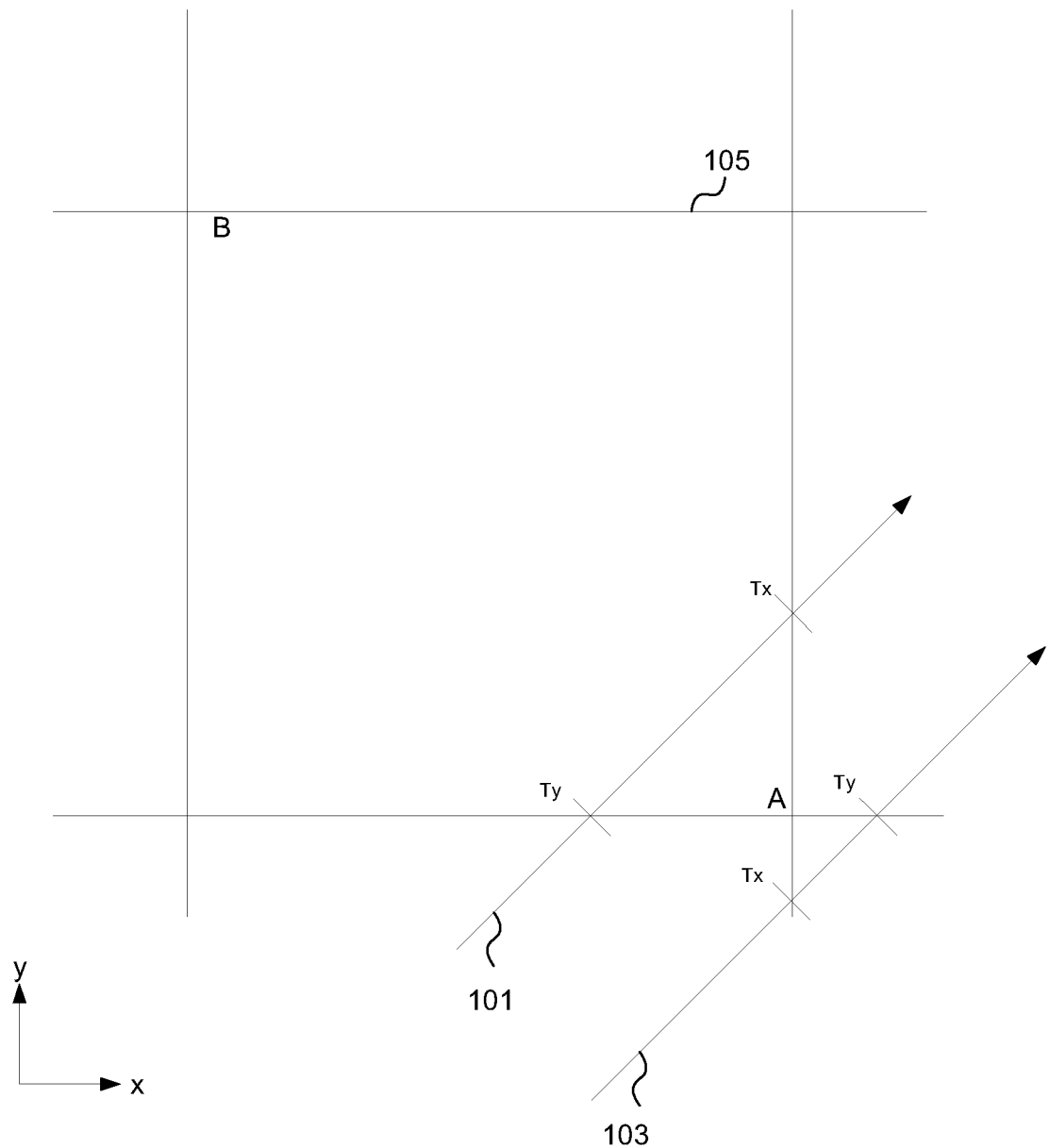
FIG. 1 shows a schematic illustration of an edge test to determine whether a ray intersects an object.

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Aspects of the present disclosure are directed to ray tracing techniques where rays are tested for intersection with volumes within a scene (e.g. with bounding volumes corresponding to respective nodes of an acceleration structure) at differing levels of bit-precision. In more detail, rays are first tested for intersection with a volume at a first level of precision (e.g. bit-precision). A level of bit-precision may refer to the number of bits of the operands used in the intersection testing. One or more of those tested rays may then be retested for intersection with the same volume at a second level of precision greater than the first level (e.g. using operands with a greater number of bits compared to the first level of bit precision). Whether a ray is retested at the higher level of precision depends on the outcome of the first intersection test at the lower level of precision. For example, if a ray is found not to intersect the volume in the first test (i.e. the result of the first test is a "miss"), then the ray is not retested. In some examples, if a ray is found to intersect with the volume in the first (low precision) test (i.e. the result of the first test is a "hit") then the ray is retested at the higher level of precision. The low precision intersection testing in some examples described herein is performed conservatively in the sense that any errors introduced due to the lower precision of the testing may result in false hits (i.e. the result could be a "hit" even though the ray does not actually intersect with the volume), but the errors introduced due to the low precision of the testing will not result in false misses (i.e. the result cannot be a "miss" if the ray does in fact intersect with the volume). Therefore, in these examples, the "misses" determined by a low precision test can be treated as "definite misses" and as such do not need to be retested with a high precision test. However, in these examples, the "hits" determined by a low precision test are treated as "may be hits" and are retested at high precision to correctly determine which of the "may be hits" are hits and which are misses. Therefore, in this example, the low precision tests can have two possible outcomes (i.e. two types of intersection testing results): (i) definite miss, or (ii) may be hit. As described herein, a "may be hit" can be considered to be a "hit that is to be retested".

In some other examples, the low precision tests can have three possible outcomes (i.e. three types of intersection testing results): (i) definite miss, (ii) may be hit, and (iii) confident hit. In these examples, only the "may be hit" results from the low precision testing need to be retested at high precision. A "confident hit" can be considered to be a "hit that is not to be retested", and a "may be hit" can be considered to be a "hit that is to be retested". If a ray is found to intersect the volume in the first test, then it could be a confident hit or a may be hit, and the low precision test can decide whether to treat it as a confident hit or a may be hit based on how close to being a miss the intersection hit was. If it was so close that the hit could be a false hit due to the error introduced by the low precision of the testing then it is treated as a "may be hit", i.e. a hit that is to be retested at high precision. If there is confidence that the hit determined by the low precision testing is a true hit (i.e. not a false hit) then it is treated as a "confident hit", i.e. a hit that is not to be retested at high precision. In order to determine whether to treat the hit as a "may be hit" or a "confident hit", a minimum distance between the ray and a silhouette edge of the volume may be considered. If this distance is less than a specified threshold, the ray is retested for intersection with the volume at the higher level of bit precision. By only retesting rays subject to the condition that the ray passes within a specified distance of a silhouette edge of the volume, ray tracing can be performed that benefits from lower-precision testing (which can provide associated benefits in performance and hardware cost) for a large proportion of the intersection tests that are performed. Even though a small proportion of the intersection tests are performed twice (once at low precision and once at high precision), the overall effect on performance of using the low precision testing as described herein is positive.

There will now be described a general example approach to performing intersection testing where a ray is tested against a volume. In particular, the volume is, in these examples, an axis-aligned bounding box.

A ray can be expressed mathematically in vector form as:

$$r = o + Td \quad (1)$$

where r is the ray, o is the ray's origin with respect to the coordinate system being used and d is the direction vector for the ray, and T is a scalar.

A plane can be expressed vectorially as a set of points p such that:

$$(p - p_0) \cdot n = 0 \quad (2)$$

where $p_o$ is a known point on the plane and n is the normal vector to the plane. In other words, the set of points p satisfying equation (2) lie on the plane.

At an intersection between the ray and the plane r=p. The intersection distance between a ray origin and a plane (i.e. the distance between the ray origin and the intersection of the ray and the plane) can be found by combining equation (1) and equation (2) with r=p, and rearranging for T. In the example explained below, it is assumed that the plane is axis-aligned, i.e. aligned with the coordinate system, and thus the normal vector n contains only one non-zero component, which for a normalised vector is equal to 1. For generality, denoting the non-zero component of the normal vector as the i'th component (so, e.g., for a three-dimensional case, i∈x,y,x), the combination of equations (1) and (2) can be rewritten as:

$$o_i + Td_i - p_{oi} = 0 \quad (3)$$

And hence:

$$T = \frac{p_{oi} - o_i}{d_i} \quad (4)$$

FIG. 1 shows an example of two rays 101 and 103 and a volume 105. In this example, the volume is two-dimensional (2D) for ease of illustration. In 2D examples, the "volume" is an area. As shown, ray 101 intersects the volume 105 and ray 103 does not intersect volume 105.

To determine whether a ray intersects the 2D volume 105, a side test on points A and B is performed, where A and B are at diametrically opposed corners of the volume 105. Each side test is performed to determine what side of the point under test the ray passes on. In different examples, when the volume is a 3D volume, the side tests determine which side of an edge the ray passes on.

For performing intersection testing against point A, two intersection distances for each ray are determined. These intersection distances are denoted $T_x$ and $T_y$ in FIG. 1. $T_x$ is the distance between the origin of the ray and the point where the ray has the same x component as the point A; and $T_y$ is the distance between the origin of the ray and the point where the ray has the same y component as the point A.

For intersecting rays, e.g. for the intersecting ray 101:

$$T_y \leq T_x \quad (5)$$

For the non-intersecting ray 103:

$$T_x < T_y \quad (6)$$

Using the equation for T given by (4), it can be seen that the generalised inequality to be evaluated to determine what side of an edge (in a 3D example) or point (in a 2D example) a ray passes on is given by:

$$\frac{p_{oi} - o_i}{d_i} \leq \frac{p_{oj} - o_j}{d_j} \quad (7)$$

To avoid the cost of performing a division operation, inequality (7) can be rewritten as:

$$(p_{oi} - o_i)d_j \leq (p_{oj} - o_j)d_i \quad (8)$$

Figure 2:
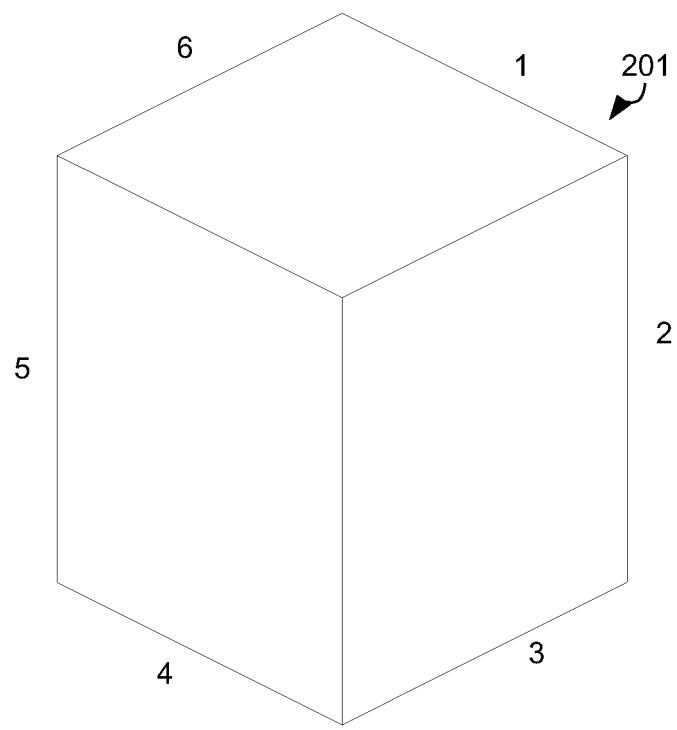
FIG. 2 shows a schematic illustration of a three-dimensional bounding volume to be intersection tested.
Figure 2:
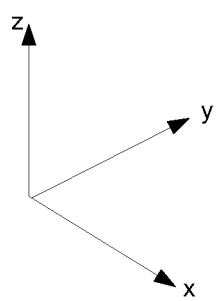

In the example shown in FIG. 1, point A is the bottom right corner of the volume, i=y and j=x, and if the inequality (8) (or inequality (7)) is true then the ray passes on the inside of point A, whereas if the inequality (8) (or inequality (7)) is false then the ray passes on the outside of point A. A similar test is performed in respect of corner point B which is the top left corner of the volume 105 (i.e. diametrically opposed to point A). For point B the values can be set as i=x and j=y (which is the opposite as for the test for point A), and if the inequality (8) (or inequality (7)) is true then the ray passes on the inside of point B, whereas if the inequality (8) (or inequality (7)) is false then the ray passes on the outside of point B. To determine that the ray intersects the volume 105, the inequalities for both point A and B must be true, whereas if either inequality is false then it is determined that the ray does not intersect the volume 105. FIG. 2 shows an example of a volume 201 extended to three dimensions. In this example, the volume 201 is an axis-aligned bounding box (AABB). Since the volume 201 is axis-aligned, each of the edges of the box 201 is parallel to one of the x, y or z axes. The volume is shown comprising a set of silhouette edges, labelled 1 to 6. A silhouette edge is an edge defining part of the silhouette of the volume. The silhouette edges are determined from a line of sight along the direction of the ray vector, i.e. the volume is depicted as viewed from from a camera viewpoint, e.g. positioned at the ray's origin and directed along the direction of the ray. The volume 201 shown in FIG. 2 is merely for illustration and could be, for example, the volume corresponding to a root note, a parent node, a child node and/or a leaf node in the acceleration structure.

In this three-dimensional example, the intersection of two planes forms a line rather than a point as in the 2D case. Thus, the side test, performed on a 3D volume, is used to determine what side of a silhouette edge (which takes the form of a line) the ray passes on, wherein the side test performed on a 3D volume may be referred to herein as an "edge test". To determine whether a ray intersects the volume 201, an intersection test is performed for each of the silhouette edges 1 to 6. Each intersection test comprises performing the comparison of values specified in inequality (8).

The box 201 is formed from six planes, wherein for each axis (x, y, z) two of the planes have normal parallel to that axis, such that the component value of those planes for that axis are constant across each of the planes. Of the two parallel planes, one will have a higher component value along the relevant axis. Therefore, for each axis there is a maximum and a minimum component value defined by the planes defining the box 201. The minimum values along each axis ($x_{min}$, $y_{min}$ and $z_{min}$) can define a 'minimum' position as a vector $p_{min}$, where $p_{min} = (x_{min}, y_{min}, z_{min})$ and the maximum values along each axis ($x_{max}$, $y_{max}$ and $z_{max}$) can define a 'maximum' position as a vector $p_{max}$, where $p_{max} = (x_{max}, y_{max}, z_{max})$. Therefore, $p_{min}$ and $p_{max}$ are diametrically opposed corner positions of the box 201 and can be used in inequality (8) for the edge comparison tests.

To simplify the edge comparison tests, the vectors $p_{min}'$ and $p_{max}'$ can be defined (and e.g. pre-computed) as:

$$p_{min}' = p_{min} - o \quad (9)$$

$$p_{max}' = p_{max} - o \quad (10)$$

The vectors $p_{min}'$ and $p_{max}'$ represent the distance between the ray origin (o) and $p_{min}$ and $p_{max}$ respectively. As described above, because the volume is axis-aligned, it follows that there are two planes of the bounding box lying on each axis, i.e. two 'x' planes (planes having constant x components), two 'y' planes (planes having constant y components) and two 'z' planes (planes having constant z components). The components of the vector $p_{min}'$ represent the displacements in x, y and z components from the ray origin to the minimum x, y and z planes. The components of the vector $p_{max}'$ represent the displacements in x, y and z components from the ray origin to the maximum x, y and z planes.

Which of the minimum or maximum planes are chosen to evaluate inequality (8) will depend on which two planes intersect at the edge being tested.

Equations (9) and (10) can be used to re-write inequality (8) as:

$$p_i' d_j \le p_j' d_i \quad (11)$$

where $p_i' = p_{min,i} - o_i$ or $p_i' = p_{max,i} - o_i$, and $p_j' = p_{min,j} - o_j$ or $p_j' = p_{max,j} - o_j$.

For example, edge 6 shown in FIG. 2 is along the intersection between the minimum x plane (i.e. of the two planes which have constant x values, the plane having the smaller x value) and the maximum z plane (i.e. of the two planes which have constant z values, the plane having the larger z value). The ray will pass the intersection test based on edge 6 if the ray intersects with the maximum z plane before it intersects with the minimum x plane, i.e. if $p_{max,z}' d_x \le p_{min,x}' d_z$, where $p_{max,z}' = p_{max,z} - o_z$ and $p_{min,x}' = p_{min,x} - o_x$.

As another example, edge 2 shown in FIG. 2 is along the intersection between the maximum x plane (i.e. of the two planes which have constant x values, the plane having the larger x value) and the maximum y plane (i.e. of the two planes which have constant y values, the plane having the larger y value). The ray will pass the intersection test based on edge 2 if the ray intersects with the maximum x plane before it intersects with the maximum y plane, i.e. if $p_{max,x}' d_y \le p_{max,y}' d_x$, where $p_{max,x}' = p_{max,x} - o_x$ and $p_{max,y}' = p_{max,y} - o_y$.

It will be apparent how to perform the tests for each of the six edges labelled 1 to 6 in FIG. 2 (i.e. the silhouette edges). If all six tests are passed then it is determined that the ray intersects the volume 201. However, if any one or more of the six tests fails then it is determined that the ray does not intersect with the volume 201, i.e. the ray passes outside one or more of the six edges.

As described in more detail below, distance and direction checks may also be performed to check whether the ray's origin and direction are such that the ray is travelling away from the box, or whether the ray endpoint falls short of the box. If either the ray is travelling away from the box, or the ray endpoint falls short of the box then the ray does not intersect with the box.

Thus, in summary, to perform a ray intersection test for volume 201, an edge test is performed for each silhouette edge 1 to 6 to determine what side of each of those edges the ray passes on, where each edge test involves performing an evaluation to determine whether the condition specified in equation (11) is true for the two planes forming the edge under test.

Figure 3:
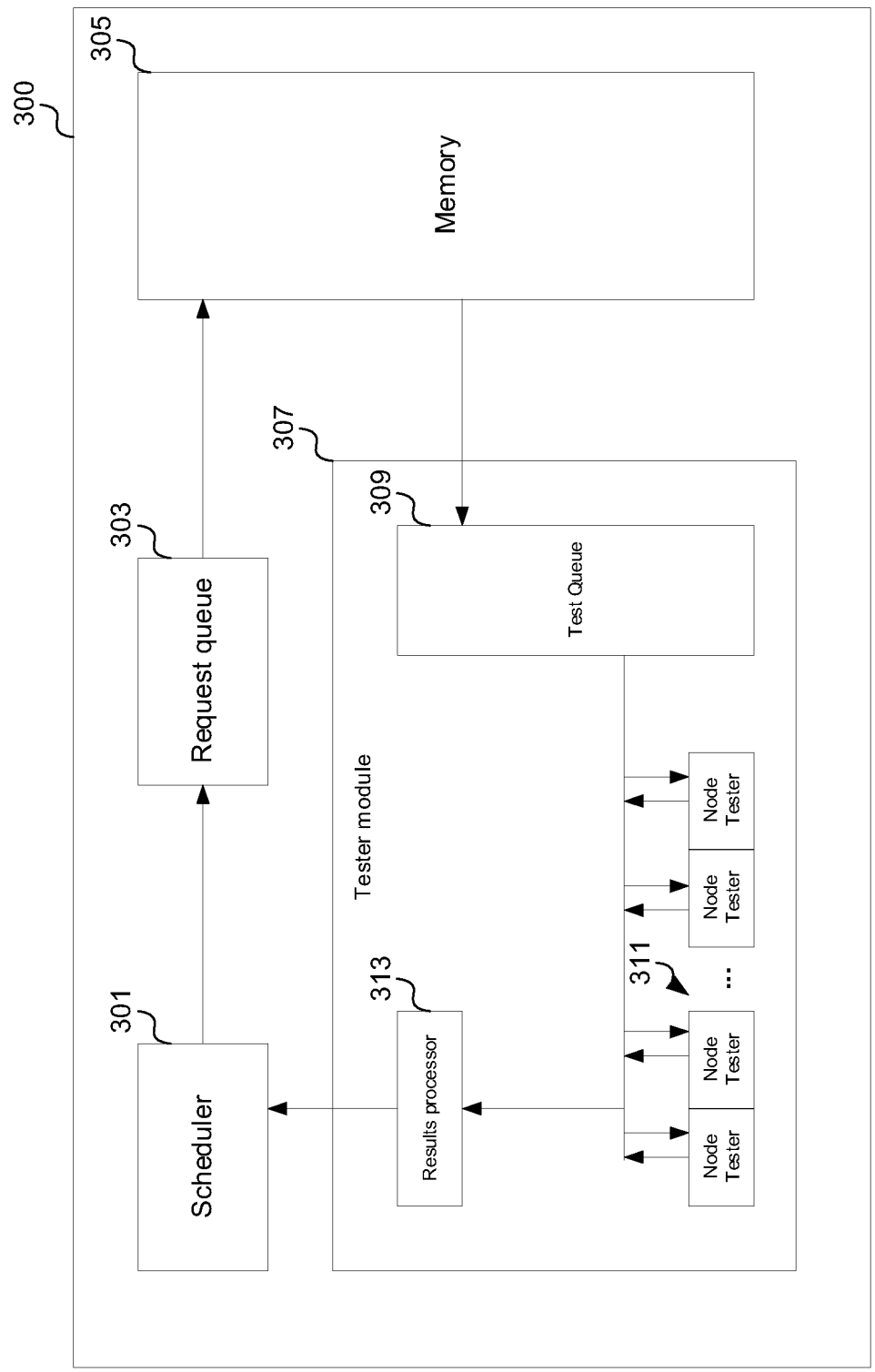
FIG. 3 shows an example ray tracing system.

FIG. 3 shows an example of a ray tracing system for performing intersection testing in the manner described above. Ray tracing system 300 may be configured to implement intersection testing of rays with volumes, e.g. axis-aligned boxes.

The ray tracing system 300 comprises a scheduler 301, request queue 303, memory 305 and a tester module 307. The tester module comprises a test queue 309, a set of one or more node testers (denoted generally at 311) and a results processor 313. The request queue 303 and the test queue 309 may take the form of buffers, e.g. stacks (i.e. first-in-last-out (FILO) buffers) or first-in-first-out (FIFO) buffers. The node testers may be implemented as hardware units (e.g. using fixed-function circuitry) or in software, for example as shader code executed by a central processing unit (CPU) or a graphics processing unit (GPU).

The scheduler 301 receives instructions to trace (i.e. to perform intersection testing for) a set of one or more rays. The scheduler can collect rays before the rays are issued to the request queue 303. The scheduler 301 may do this to group rays which require access to the same block of memory 305. A group of rays that reference the same block of memory 305 may be referred to as a packet. As an example, for the initial stage of the intersection testing, it may be the case that all rays will intersect the root node and thus require access to the same block of memory 305 and so fall within one packet. Once the scheduler has assembled one or more rays into a packet, the scheduler will issue the packet and cause the packet to join the request queue 303 to request the node data (i.e. volume data for the appropriate node of the acceleration structure against which the rays of the packet are to be tested for intersection) for the packet from memory 305. The node data for the packet is then retrieved from memory 305 and passed to the tester module 307.

At the tester module, the node data for a packet is received at the test queue 309. The ray data for the packet is also received at the tester module. The ray data for the packet may be received from a memory (e.g. memory 305), or in other examples it may be received from request queue 303 (via a link, not shown in FIG. 3), to be associated with the corresponding node data at test queue 309. The tester module 307 allocates rays from the packet to the node testers 311. The tester module 307 might allocate the rays sequentially. The rays may be allocated to the node testers in dependence on the availability of the testers (e.g. allocation may be prioritized to node testers that are not performing intersection testing for another ray over node testers that are active, e.g. performing intersection testing on another ray). When a ray of the packet has been allocated to a node tester, that node tester performs intersection testing to determine whether that ray intersects the volume corresponding to the node that ray is being tested against, e.g. by performing edge tests for the appropriate edges of the volume, e.g. for the six silhouette edges of the box 201 labelled in FIG. 2, as described above.

The node testers each output the result of the intersection tests they have performed to the results processor 313. The results processor 313 processes the results of the intersection tests. Specifically, if a ray has been found to not intersect the node it was being tested against, the processor 313 does not schedule intersection tests for that ray in respect of the child nodes of the node which was not intersected. If the results processor 313 determines that a ray has intersected a node it was being tested against, that ray is output from the tester module 307 back to the scheduler 301, where it will be grouped into a packet and scheduled for intersection testing in respect of a child node of the intersected node.

The above-described process is repeated iteratively until the rays have no more hits. In response to an intersection of a ray with a leaf node, objects within that leaf node (e.g. triangles) are each scheduled for intersection testing with the ray. If the result of all the intersection testing for a ray is that the ray does not intersect with any objects in the scene then a 'miss' result is returned and can be processed accordingly. If the result of all the intersection testing for a ray is that the ray intersects with a single object then data for this intersection can be returned with a 'hit' result and processed accordingly. If the result of all the intersection testing for a ray is that the ray intersects with more than one object then the intersection distances for the intersections (i.e. the distances from the ray origin to the intersection points) are compared to find the 'closest hit', i.e. the intersection point closest to the ray origin (i.e. the intersection point with the smallest value of T). Data for this closest hit intersection can be returned with a 'hit result' and processed accordingly.

Ray tracing system 300 might implement floating point arithmetic. That is, the node testers 311 may perform intersection testing by operating on floating point inputs. The precision at which the node testers operate (e.g., the bit-size of the inputs they operate on, or more generally the bit-size of the operands used in intersection testing) can impact both the performance and cost (e.g., computational and/or hardware cost) of the ray tracing system. For example, processing time, power consumption and/or hardware area can be reduced by reducing the bit-level precision of the intersection tests performed by the node testers 311. One approach to achieve these aims (i.e. reduced processing time, reduced power consumption and/or reduced hardware area) is to replace the node testers 311 with lower precision testers, e.g. testers that operate on operands formed of fewer bits. Whilst this may result in reduced hardware area (i.e. reduced silicon area) for the testers, and each individual intersection test may be quicker and consume less power, it is possible that the reduction in precision may negatively impact performance. The reason is that lower precision node tests are typically implemented conservatively, i.e. in a manner that prevents false misses (i.e., determining that a ray misses a node when it in fact intersects the node) due to the adverse impact false misses have on the quality of the final rendered image, but increases the likelihood of generating false hits, or false positives (i.e. determining that a ray hits a node when it in fact misses the node). This increases the number of child nodes that are unnecessarily intersection tested when the parent node was in fact not intersected by the ray, and increases the number of primitive intersection tests that are unnecessarily performed when a false hit is found in respect of a leaf node, which can decrease performance. The problem of false positive results also tends to get worse as the size of the nodes decreases (e.g. for lower levels of the acceleration structure) and as the distance from the ray origin to the nodes increases. It is noted that the primitive intersection tests are performed at full precision (not the lower precision) so the final intersection testing results are correct even when lower precision tests are performed for the node tests.

Described herein is a ray tracing system that is capable of performing intersection testing at multiple levels of bit precision. Rays are initially tested for intersection at a relatively low level of precision. In some examples, the low precision tests can have two possible outcomes: (i) definite miss, or (ii) may be hit. In other words, the low precision testing is performed conservatively so that a miss result is interpreted as a definite miss (i.e. it does not need to be retested at high precision), but a hit result is interpreted as may be a hit (i.e. it does need to be retested at high precision). In this example, the tests which return as hits from the low precision tests (i.e. the may be hits) are classified as requiring retesting at a higher level of precision, and high precision tests are performed for these tests. In this example, the number of tests that are performed at high precision is reduced because the misses from the low precision testing do not need to be reperformed at high precision.

In other examples, the low precision tests can have three possible outcomes: (i) definite miss, (ii) may be hit, or (iii) confident hit. In other words, in these examples the hits from the low precision testing can be classified as confident hits which do not need to be retested at high precision, or as may be hits which do need to be retested at high precision. That is, if it is determined from the lower precision test that a ray has not missed the volume of a node, that ray is then classified as either having intersected the node, or as requiring retesting at a higher level of precision. Whether a ray is classified as having hit a node or as requiring retesting at a higher level of precision may depend on an indication of how close the ray was to missing the volume, which may be determined based on, for each silhouette edge, the difference in the distances from the ray origin to the two intersection points where the ray intersects with the two planes defining that silhouette edge. In some examples, the indication of how close the ray was to missing the volume may be determined based on, for each silhouette edge, a closest distance between the ray and the silhouette edge. Rays may be retested if the indication of how close the ray was to missing the volume is less than a specified threshold. The specified threshold may be programmable, and may for example be chosen to indicate whether the ray is close enough to missing the volume that the margin of error in the calculation of the lower precision intersection testing has a high likelihood (e.g. above a threshold likelihood) of producing a false hit for the ray. The rays which are classified as "may be hits" are then retested for intersection with the same volume at a higher level of precision. Retesting the rays at the higher level of precision can prevent an increase in the number of node tests and primitive intersection tests that can arise from the use of lower precision intersection tests. Thus, the ray tracing system can benefit from a reduction in hardware area arising from the lower precision testers without suffering a negative impact in performance. It is noted that in some examples, the 'confident hits' from the low precision testing are not definite hits, but rather the probability of a 'confident hit' result from the low precision testing being a false hit is below a threshold. If the primitive intersection tests are performed at full resolution then false hits in the node testing (i.e. the box testing) do not introduce artefacts into the rendering results, so false hits in the node testing are tolerable, they just reduce the efficiency of the system. In contrast, false misses in the node testing are not tolerable because they can introduce artefacts in the rendering results.

Figure 4:
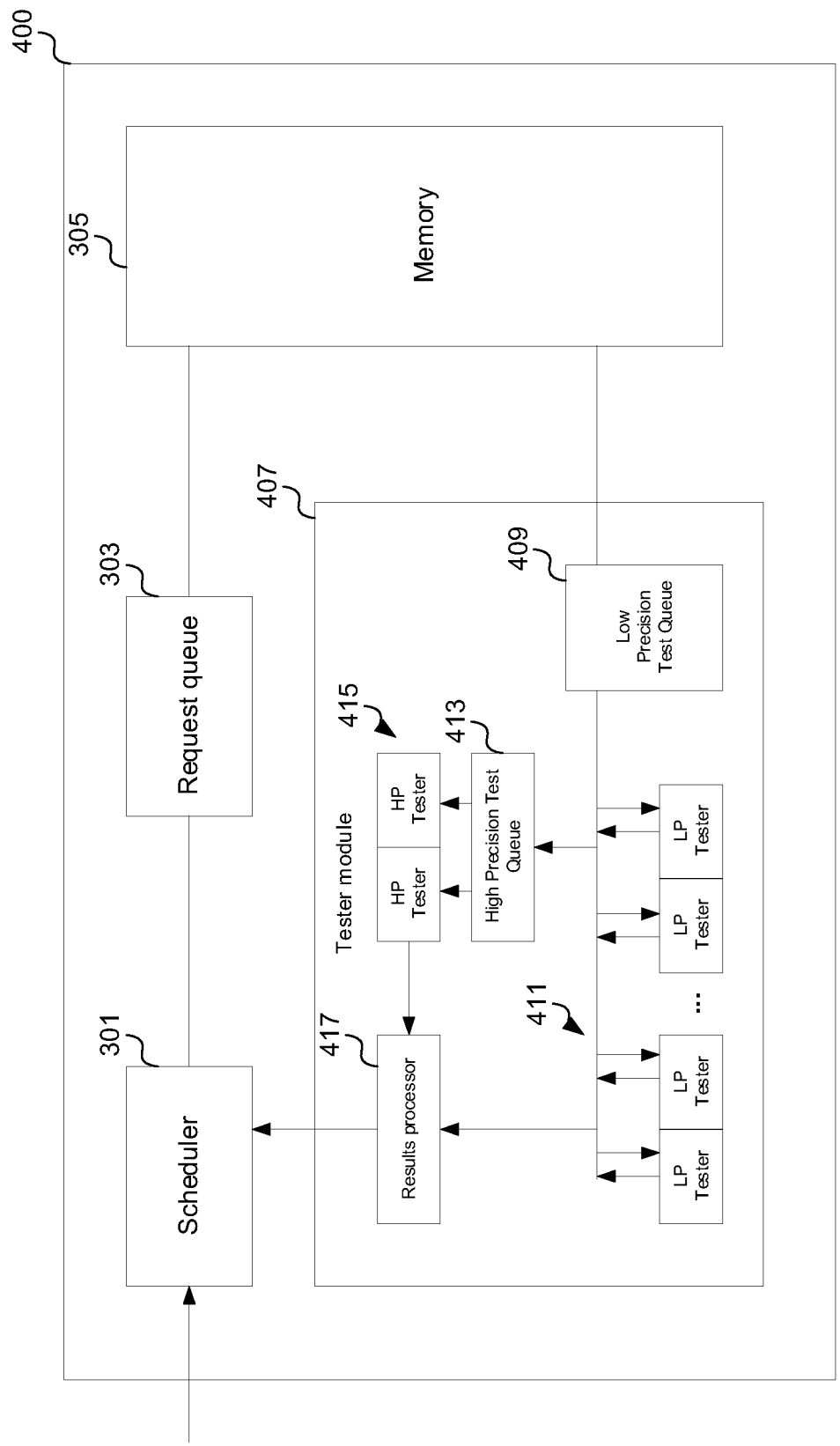
FIG. 4 shows a ray tracing system according to an embodiment of the present disclosure.

FIG. 4 shows an example ray tracing system 400 according to an embodiment of the present disclosure.

The system 400 comprises scheduler 301, request queue 303 and memory 305, which operate in the same manner as those components described above with respect to FIG. 3. The system 400 further comprises a tester module 407 configured to perform intersection testing on packets of one or more rays and node (i.e. volume) data received from the memory 305. Intersection testing is performed on the rays to determine whether the rays intersect a volume under test.

The tester module 407 comprises a first set of one or more testers 411 and a second set of one or more testers 415. The number of testers within each set may be implementation specific. Though four testers are shown in set 411 and two testers in set 415, this is merely for the purpose of illustration. The first set of testers 411 are configured to perform intersection testing at a first level of precision and the second set of testers 415 are configured to perform intersection testing at a second level of precision greater than the first level of precision. For example, the second set of testers 415 are configured to perform intersection testing at a higher level of bit precision than the first set of testers 411. For brevity, the set of testers 411 may therefore be referred to as low precision (LP) testers and the set of testers 415 as high precision (HP) testers. The testers may be implemented as hardware units. Alternatively, the testers may be implemented as software modules, e.g. shader code executed by a processing unit, e.g. a CPU or GPU.

Each of the testers 411 and 415 may be configured to operate using floating point arithmetic. In other words, the testers may receive floating point inputs and perform intersection testing by performing calculations on floating point operands. The floating point operands used by the testers 411 and 413 may comprise a sign bit, exponent field and mantissa field. The exponent field for the low precision and high precision testers may be equal in size, i.e. the floating point operands used by both sets of testers 411 and 415 may comprise an equal number of exponent bits. This conveniently enables the low precision testers to operate across the same numerical range as the high precision testers. In one example, the operands for the high precision testers may have a 32-bit floating point format (e.g. a standard single precision floating point format) which has 1 sign bit, 8 exponent bits and 23 mantissa bits; whereas the operands for the low precision testers may have a (non-standard) 16-bit floating point format which has 1 sign bit, 8 exponent bits and 7 mantissa bits. As explained in more detail below, the reduction in the mantissa bits (e.g. from 23 bits to 7 bits) can be performed in accordance with particular rounding modes for different operands to ensure that the low precision testing results are conservative. Performing the low precision intersection testing conservatively in the manner described here means that the intersection tests are performed in a way that is biased towards a finding of intersection.

Each set of testers 411 and 415 are associated with a respective test queue 409 and 413. Each test queue might be implemented as a buffer, for example a FILO buffer or a FIFO buffer. The low precision test queue 409 operates to allocate rays to the low precision testers 411 for intersection testing. Likewise, the high precision test queue 413 operates to allocate rays to the high precision testers 415 for intersection testing.

In operation, scheduler 301 receives instructions to trace a set of one or more rays. The scheduler can collect rays into packets before the rays are issued to the request queue 303, as described above. The number of rays within a packet is variable and might depend on, for example, the level of the acceleration structure being traversed, the image to be rendered etc. In general, a given packet contains one or more rays. Once the scheduler 301 has assembled one or more rays into a packet, the scheduler will issue the packet and cause the packet to join the request queue 303 to request the node data for the packet from memory 305. The node data might include, for example, data defining the volume for that node. The node data for the packet is then retrieved from memory 305 and passed to the tester module 407.

At the tester module 407, the ray data and node data for a packet are received at the low precision test queue 409. The tester module 407 allocates rays from the packet loaded within the test queue 409 to the low precision testers 411. Thus, the tester module 407 operates to first allocate received rays to the low precision testers 411. In other words, each ray received at the tester module 407 is input into the low precision test queue 409 and first allocated to a low precision tester. The tester module 407 might allocate the rays sequentially. The rays may be allocated to the testers 411 in dependence on the availability of the testers (e.g. allocation may be prioritized to testers that are not performing intersection testing for another ray over testers that are active, e.g. performing intersection testing on another ray). When a ray of the packet has been allocated to a low precision tester, that tester performs intersection testing to determine whether that allocated ray intersects the volume of the node that ray is being tested against.

Each of the low precision testers 411 is configured to perform intersection testing conservatively, i.e. in a way that prevents false negative results (i.e. a result that indicates the ray does not intersect with the volume when in fact it does). To make the intersection testing conservative, each of the low precision testers may be configured to implement rounding modes that provide an upper bound on the size of the volume being tested, rather than a lower bound. This will be explained in more detail below.

The rounding modes matter when using low precision to ensure that the low precision results are conservative (i.e. they prevent false misses but allow for false hits). In the example described above, the high precision 32-bit floating point inputs (including 23 mantissa bits) are converted to the low precision 16-bit floating point format which includes 7 mantissa bits. When converting to lower precision, the rounding modes for each input are given below to keep the low precision intersection testing conservative. The ray origin requires two roundings of the low precision variable, one rounded down and one rounded up. This is so when translating a box to the origin's coordinate system, the minimum plane always has the lowest bound, and the maximum plane always has the highest bound.

The ray direction vector d—round away from zero (RAZ)
The ray origin (min) $o_{min}$—round towards negative infinity (RNI)
The ray origin (max) $o_{max}$—round towards positive infinity (RPI)
T—round towards positive infinity (RPI)
The box minimum positions $p_{min}$—round towards negative infinity (RNI)
The box maximum positions $p_{max}$—round towards positive infinity (RPI)

When translating a box by the ray origin in the low precision intersection testing, the two versions of the ray origin with opposite roundings are used. The max origin ($o_{max}$) is subtracted from the minimum plane, and the minimum origin ($o_{min}$) is subtracted from the maximum plane. This is to ensure the box expands and never shrinks.

As explained above, the intersection test performed by a low precision tester may comprise performing a plurality of edge tests for the silhouette edges of the volume. An edge test may be performed for each silhouette edge of the volume, e.g. edges 1 to 6 of volume 201 in the example shown in FIG. 2 in which the volume is an axis-aligned bounding box. Each edge test is performed to determine which side of the edge under test the ray passes on.

To perform the intersection test between a ray and volume, a low precision tester may perform the following calculations.

To provide an upper bound on the size of the volume, the tester implements a rounding mode such that the upper bound (taking into account the rounding error) of the ray's origin, $o_{max}$, is subtracted from the vector $p_{min}$ representing the corner point of the volume where the minimum planes meet, and the lower bound (taking into account the rounding error) of the ray's origin, $o_{min}$, is subtracted from the vector $p_{max}$ representing the corner point of the volume where the maximum planes meet. This expands the size of the box, such that the rounding due to the lower precision cannot cause false misses.

Thus, the tester calculates the coordinate transformation as:

$$p_{min}' = p_{min} - o_{max} \tag{12}$$

$$p_{max}' = p_{max} - o_{min} \tag{13}$$

The value $o_{max}$ may be calculated using the 'round towards positive infinity' (RPI) rounding mode, and the value $o_{min}$ calculated using the 'round towards negative infinity' (RNI) rounding mode.

The tester also performs distance calculations to determine whether the ray is travelling in a direction away from the bounding volume and/or whether the endpoint of the ray is before the bounding volume is reached; i.e. whether the bounding volume is out of reach of the ray.

To do this, the tester first calculates the endpoint of the ray, $r_{end}$, as:

$$r_{end} = T_{current} d \quad (14)$$

where $T_{current}$ represents the distance from the ray origin to the current closest intersection for the ray, or if no intersections have currently been found for the ray then $T_{current}$ is set to the clipping distance of the ray which indicates the maximum distance that the ray will be traversed through the scene without intersecting anything before the traversal of the ray is stopped. The ray does not need to be traversed any further from the ray's origin than the endpoint $r_{end}$.

To provide an upper bound on this value, the tester evaluates equation (14) using the 'round away from zero' (RAZ) rounding mode. This rounding mode extends the distance of the ray, i.e. provides an upper bound on the distance of the ray.

The tester uses the values of $p_{min}'$ and $p_{max}'$ and the value of d to determine whether the ray is travelling away from the volume. Specifically, the tester determines the ray is travelling away from the volume (and hence does not intersect the volume) if, for any of the x, y or z components:

$$p_{min}' > 0 \text{ when } d < 0$$

$$p_{max}' < 0 \text{ when } d > 0 \quad (15)$$

i.e. if $p_{min,x}' > 0$ when $d_x < 0$ or if $p_{max,x}' < 0$ when $d_x > 0$,
or if $p_{min,y}' > 0$ when $d_y < 0$ or if $p_{max,y}' < 0$ when $d_y > 0$,
or if $p_{min,z}' > 0$ when $d_z < 0$ or if $p_{max,z}' < 0$ when $d_z > 0$.

The tester uses the values of $p_{min}'$ and $p_{max}'$ and the value of $r_{end}$ to determine whether the volume is out of reach of the ray. The tester determines the volume is out of reach of the ray if:

$$p_{min}' > r_{end} \text{ when } d > 0$$

$$p_{max}' < r_{end} \text{ when } d < 0 \quad (16)$$

i.e. if $p_{min,x}' > r_{end,x}$ when $d_x > 0$ or if $p_{max,x}' < r_{end,x}$ when $d_x < 0$,
or if $p_{min,y}' > r_{end,y}$ when $d_y > 0$ or if $p_{max,y}' < r_{end,y}$ when $d_y < 0$,
or if $p_{min,z}' > r_{end,z}$ when $d_z > 0$ or if $p_{max,z}' < r_{end,z}$ when $d_z < 0$.

If the tester determines that either of the conditions specified in (15) and (16) are satisfied, it determines that the ray does not intersect the volume and the intersection test for that ray is completed, without needing to perform any of the edge tests on the silhouette edges.

If none of the conditions specified in equations (15) and (16) are satisfied, the low precision tester proceeds to perform the set of silhouette edge tests.

An edge test is performed on each of the silhouette edges defining the bounding volume. To test a particular edge, the planes that intersect to define that edge are identified. The planes are identified from knowledge of the edge to be tested (which indicates on which axes the two intersecting planes lie), and the direction of the ray, d. The direction of the ray is used to select the closest or furthest plane for each of the two axes.

Thus, to test an edge lying along or parallel to axis k, the two planes having constant components on the other axes i and j are identified that intersect to define that edge (where i, j k∈x, y, z). Two results are then calculated, as follows:

$$result_1 = p_i' d_j$$

$$result_2 = p_j' d_i \quad (17)$$

The results $result_1$ and $result_2$ correspond to the components of inequality (11). Accordingly, in equation (17), $p_i'$ and $p_j'$ are calculated for the two planes that intersect to define the edge under test.

The values of the indices i and j are chosen so that a ray is determined to be 'outside' the edge (and hence do not intersect the volume) if:

$$result_1 - result_2 > 2ULP(\max(|result1|, |result2|)) \quad (18)$$

where ULP is the unit of least precision of the max value.

If any of the edge tests do not satisfy this inequality (i.e. the ray is determined to pass outside any of the silhouette edges) the ray is determined not to intersect the volume. It can be advantageous to use RNI rounding in the calculation of inequality (18) in order to make it as difficult as possible to generate a miss (when the inequality is satisfied). Since only the exponent of a floating point number is required to generate its ULP (unit of least precision), the max operation is cheap to perform.

As an example, consider edge 5 of the box 201 shown in FIG. 2, which is parallel to the z axis, the two planes which define the edge 5 are the minimum x plane (i.e. of the two planes which have constant x components, the plane with the lower constant x component) and the minimum y plane (i.e. of the two planes which have constant y components, the plane with the lower constant y component). As can be seen in FIG. 2, a ray is inside the edge 5 if it crosses the minimum y plane before it crosses the minimum x plane, so we set i=x and j=y in equation 17. Therefore, a ray is determined to be outside the edge 5 (and hence not intersect the volume) if $p_x'd_y > p_y'd_x$. It will be apparent how to choose i and j in order to test each of the silhouette edges labelled 1 to 6 in FIG. 2. When the multiplications shown in FIG. 17 are performed, they are rounded to ensure conservative intersection testing results, i.e. they are rounded in opposite manners so as to make it less likely to return a miss. Therefore the multiplication of $p_i'd_j$ for determining $result_1$ is performed using a round towards negative infinity (RNI) rounding mode and the multiplication of $p_j'd_i$ for determining $result_2$ is performed using a round towards positive infinity (RPI) rounding mode.

As described above, in some examples the low precision intersection testing can output either a miss (if the low precision testing indicates that the ray passes on the outside of one or more of the silhouette edges) or a hit result (if the low precision testing indicates that the ray passes on the inside of all of the silhouette edges). A miss result from the low precision testing can be considered to be a definite miss result, such that the intersection test does not need to be reperformed at high precision. A hit result from the low precision testing can be considered to be a may be hit result, and the intersection test is reperformed at high precision.

In other examples, hit results from the low precision testing can be classified as either confident hits (which do not need to be retested at high precision) or may be hits (which need to be retested at high precision). An indication of how close the low precision hit result was to being a miss can be calculated. For example, the indication of how close the low precision hit result was to being a miss can be calculated by determining, for each silhouette edge, the difference in the distances from the ray origin to the two intersection points where the ray intersects with the two planes defining that silhouette edge. If that calculation indicates the difference is greater than a specified distance threshold, E, the tester concludes that the ray does pass on the inside of the edge, i.e. it is a confident hit which does not need to be retested at high precision. If however the calculation indicates the difference is less than a specified distance threshold, E, this indicates that it is a may be hit and the intersection test is to be performed at the higher precision level. A may be hit result indicates that, due to the errors in the edge test resulting from the low precision of that test, it cannot be confidently determined whether the ray passes on the inside or outside of the edge.

A ray passes on the inside of a silhouette edge if $result_2 > result_1$. However, $\in$ is a distance threshold, and, referring to inequalities (7) and (8), it can be seen that $result_1$ and $result_2$ do not represent distances directly. It is therefore necessary to reintroduce a division to ensure that a distance-based test behaves consistently for all orientations of rays and planes. Consequently, for each silhouette edge, the low precision testing can be confident that the ray passes on the inside of the silhouette edge if the following inequality is satisfied:

$$\frac{result_1 - result_2}{d_i \times d_j} < -\epsilon \qquad (19)$$

where $d_i$ and $d_j$ have the values from inequalities (7) and (8) above.

If the low precision testing is confident that the ray passes on the inside of all of the silhouette edges for a box then the low precision testing can be confident that the ray hits the box, and the ray does not need to be retested at high precision in respect of the box. However, if the low precision testing is not confident that the ray passes on the inside of one or more of the silhouette edges for the box (i.e. if any of the silhouette edges do not satisfy inequality (19)) then the low precision testing cannot be confident that the ray hits the box, and the ray does need to be retested at high precision in respect of the box.

The confidence threshold E may be programmable. It may be chosen so that it is equal, or approximately equal, to (or greater than) the maximum error that can be introduced into the intersection testing due to the low precision of the testing.

Therefore, in some examples, the low precision testing of each edge returns one of three results: (i) a confident determination that the ray passes on the inside of the edge under test; (ii) a definite determination that the ray does not pass on the inside of the edge under test (i.e. it passes on the outside of the edge under test) or (iii) an unconfident determination that the ray passes on the inside of the edge under test such that retesting at higher precision is required to determine whether the ray intersects the volume.

If at least one of the edge tests performed by a low precision tester indicates intersection testing of the ray is to be reperformed at high precision, the tester module causes that ray to be output from the low precision tester into the high precision test queue 413.

In summary of examples in which the low precision testing has three possible outcomes, one or more rays of a received packet are input into the low precision test queue 409 and allocated to the set of low precision testers 411 for intersection testing. Each low precision tester which is allocated a ray performs a low precision intersection test for that ray against the volume. Each low precision intersection test returns one of (i) a confident determination that the ray intersects the volume; (ii) a determination that the ray does not intersect the volume; or (iii) an unconfident determination such that re-testing is to be performed at a higher precision. Results (i) and (ii) are communicated from the low precision testers that performed the intersection test for those rays to the results processor 417. The results processor 417 processes the results of the low precision intersection tests. Specifically, if a ray has been found to not intersect the volume corresponding to a particular node it was being tested against, the processor 417 does not schedule intersection testing of the ray with any of the volumes corresponding to the child nodes of the particular node. If the results processor 417 determines that a ray has intersected a volume corresponding to the node it was being tested against, that ray is output from the tester module 407 back to the scheduler 301, where it will be grouped into a packet and intersection tested against one or more child nodes of the intersected node.

Rays for which intersection testing at a higher precision is to be performed are communicated to the high precision test queue 413. The test queue 413 then allocates the rays in that queue to the high precision testers 415. The rays may be allocated to the high precision testers in an analogous way to how rays are allocated to the low precision testers 411 by queue 409.

Each high precision tester performs intersection testing of an allocated ray against a volume in an analogous manner to how intersection testing is performed by the low precision testers 411. That is, the same intersection test is performed (i.e. the same set of processing steps are performed), with the difference being the test is run at a higher level of precision. For example, the intersection tests are performed using operands with a greater number of bits than the operands used in the low precision tests. Furthermore, higher precision floating point arithmetic units may be used in the high precision testers 415 compared to the floating point arithmetic units used in the low precision testers 411. Each high precision test performed by the testers 415 determines one of only two outputs: (i) that the ray intersects the volume; or (ii) that the ray does not intersect the volume. The results of the high precision tests are processed by the processor 417 in the same way as the results of the low precision tests, i.e., rays found to intersect the volume after the high precision test are communicated to the scheduler for intersection testing of the child nodes, and rays found not to intersect the volume after the high precision test are not scheduled for intersection testing with the child nodes.

Figure 5:
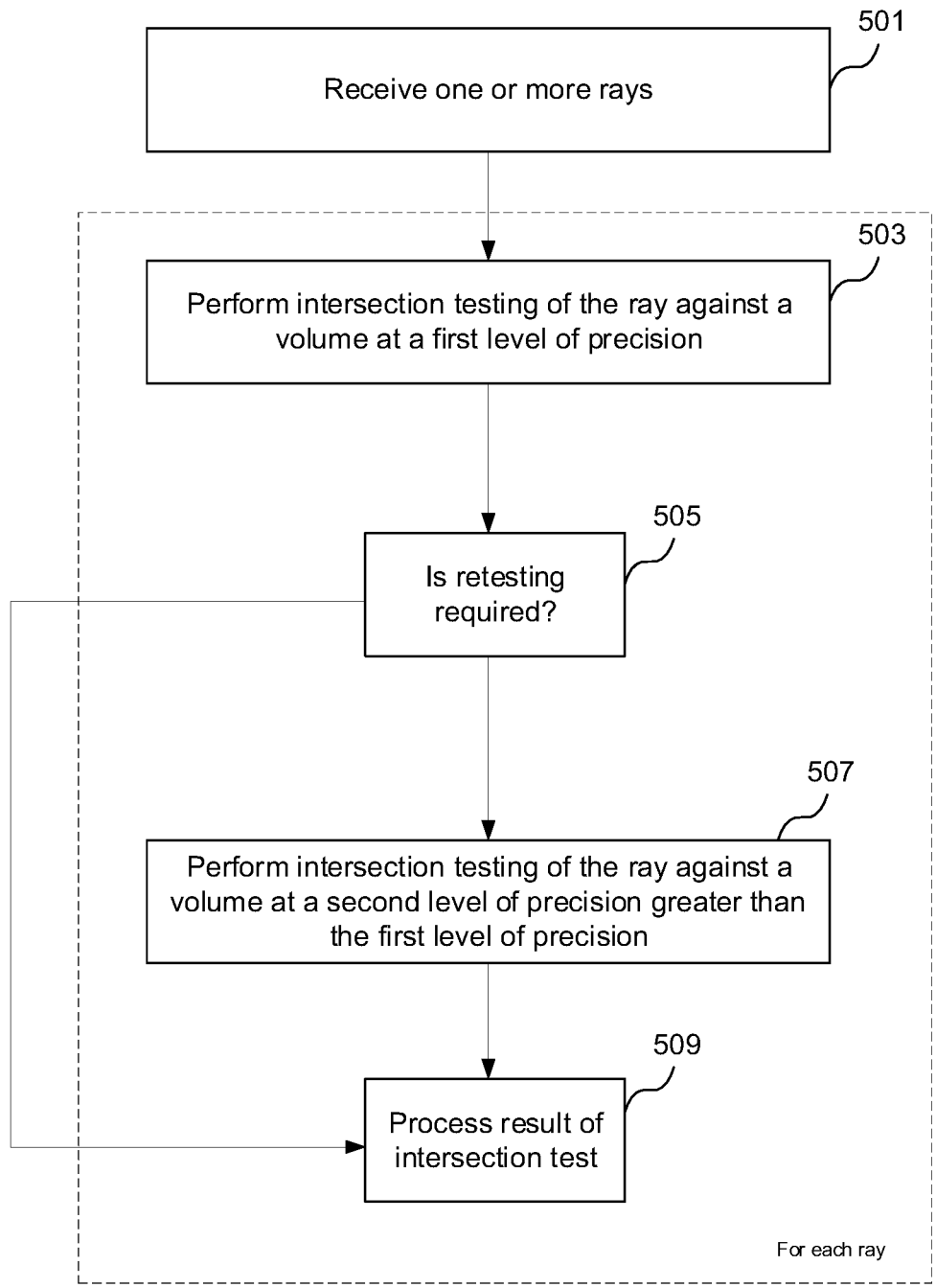
FIG. 5 shows a flowchart of steps for a method of performing intersection testing according to an embodiment of the present disclosure.

A summary of the operation of ray tracing system 400 is now provided with reference to the flow chart in FIG. 5.

At step 501, the tester module 407 receives one or more rays (e.g. a packet of rays). Steps 503 to 509 are performed for each received ray.

At step 503, intersection testing for the ray against a volume is performed at a first level of precision by one of a first set of testers (e.g. the low precision testers 411).

At step 505, it is determined whether the intersection test is to be re-performed (e.g. by the high precision testers 415) at a second level of precision higher than the first level of precision. As described above, in some examples, the tests performed by the low precision testers may have two possible outcomes (e.g. hit or miss), wherein the hit results from the low precision testing are retested at the higher precision. However, in other examples, not all of the hit results from the low precision testing need to be retested. For example, step 505 may involve determining how close a hit result was to being a miss, such that the hit result can be classified as a confident hit or an unconfident (or "may be")

hit. In these examples, the confident hits do not need to be retested at high precision, but the may be hits do need to be retested at high precision.

If it is determined by a low precision tester that retesting is not required, then the results of the intersection test are processed at step 509. This may be performed by the results processor 417 as described above.

If in step 505 it is determined that retesting is required, the ray is allocated to one of a second set of testers (e.g. the high precision testers 415) that performs intersection testing for the same volume but at a second higher level of precision (step 507). The results of that intersection test are then processed by the results processor 417. Rays that have been found to intersect (from either the low or high precision intersection test) are communicated back to the scheduler 301. Rays that have been found not to intersect a volume corresponding to a particular node of the acceleration structure (from either the low or high precision intersection test) are not scheduled for further intersection testing with volumes corresponding to child nodes of the particular node.

In the examples described above there are two levels of precision. In other examples, there could be more than two levels of precision. For example, there could be three levels of precision: low precision, medium precision and high precision. Different testers may be configured to perform intersection testing at the different levels of precision. The medium precision testers would be configured to operate similarly to the low precision testers described herein. The rays are first tested against a volume at low precision. If the low precision testing determines that an intersection test needs to be reperformed then those intersection tests are reperformed at the medium level of precision. Some of these tests can be classified by the medium precision testing as definite misses or confident hits, but there may still be some unconfident results from the medium precision testing for which testing needs to be reperformed. If the medium precision testing determines that an intersection test needs to be reperformed then those intersection tests are reperformed at the high level of precision, which can provide definite hit or miss results. In some examples, even more than three levels of precision may be implemented.

As described above, it is acceptable (in terms of whether rendering artefacts may be introduced into rendered images) for the low precision box testing to have false hits but it is not acceptable for the low precision box testing to have false misses. In the examples described above, the rounding of the values and the rounding used by the operations used in the low precision testing is chosen so that the probability of a miss result in the low precision testing is reduced wherever possible. This means that if the low precision testing provides a miss result then it is known that this is not a false miss; however, it means that if the low precision testing provides a hit result then this may be a false hit.

In some other examples, the rounding could be the opposite of that described above. In other words, the rounding of the values and the rounding used by the operations used in the low precision testing could be chosen so that the probability of a hit result in the low precision testing is reduced wherever possible. Performing the low precision intersection testing in this manner means that the intersection tests are performed in a way that is biased towards a finding of no intersection. This means that if the low precision testing provides a hit result then it is known that this is not a false hit; however, it means that if the low precision testing provides a miss result then this may be a false miss. In these examples all of the misses from the low precision testing would need to be retested at high precision.

In these examples, it is not possible to use the idea of a 'confident miss' (similar to the 'confident hit' idea described above) such that some of the misses would not need to be retested. This is because even a 'confident miss' would have a finite probability of being a false miss, and false misses (unlike false hits) in the box testing are unacceptable.

The ray tracing system of FIGS. 3 and 4 are shown as comprising a number of functional blocks. This is schematic only and is not intended to define a strict division between different logic elements of such entities. Each functional block may be provided in any suitable manner. It is to be understood that intermediate values described herein as being formed during operation need not be physically generated by the ray tracing system at any point and may merely represent logical values which conveniently describe the processing performed by the ray tracing system between its input and output.

The ray tracing system described herein may be embodied in hardware on an integrated circuit. The ray tracing system described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a ray tracing system configured to perform any of the methods described herein, or to manufacture a ray tracing system comprising any apparatus described herein. An integrated circuit definition dataset may be, for example, an integrated circuit description.

There may be provided a method of manufacturing, at an integrated circuit manufacturing system, a ray tracing system as described herein. There may be provided an integrated circuit definition dataset that, when processed in an integrated circuit manufacturing system, causes the method of manufacturing a ray tracing system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a ray tracing system will now be described with respect to FIG. 6.

Figure 6:
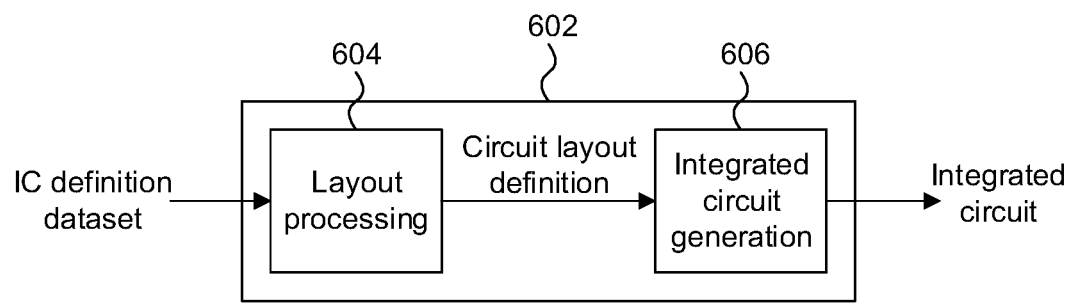
FIG. 6 is a schematic diagram of an integrated circuit manufacturing system.

FIG. 6 shows an example of an integrated circuit (IC) manufacturing system 602 which is configured to manufacture a ray tracing system as described in any of the examples herein. In particular, the IC manufacturing system 602 comprises a layout processing system 604 and an integrated circuit generation system 606. The IC manufacturing system 602 is configured to receive an IC definition dataset (e.g. defining a ray tracing system as described in any of the examples herein), process the IC definition dataset, and generate an IC according to the IC definition dataset (e.g. which embodies a ray tracing system as described in any of the examples herein). The processing of the IC definition dataset configures the IC manufacturing system 602 to manufacture an integrated circuit embodying a ray tracing system as described in any of the examples herein.

The layout processing system 604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 604 has determined the circuit layout it may output a circuit layout definition to the IC generation system 606. A circuit layout definition may be, for example, a circuit layout description.

The IC generation system 606 generates an IC according to the circuit layout definition, as is known in the art. For example, the IC generation system 606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 606 may be in the form of computer-readable code which the IC generation system 606 can use to form a suitable mask for use in generating an IC.

The different processes performed by the IC manufacturing system 602 may be implemented all in one location, e.g. by one party. Alternatively, the IC manufacturing system 602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a ray tracing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A ray-tracing system configured to perform intersection testing, comprising:
    a tester module for testing rays for intersection with a volume, the tester module being configured to receive a packet of one or more rays to be tested for intersection with the volume, wherein the tester module comprises:
        a first set of one or more testers configured to perform intersection testing with the volume at a first level of precision to provide intersection testing results; and
        a second set of one or more testers configured to perform intersection testing with the volume at a second level of precision greater than the first level of precision,
    wherein the first and second sets of testers are configured to perform intersection testing using floating point arithmetic, wherein floating point numbers at the first level of precision have fewer mantissa bits and an equal number of exponent bits compared to the floating point numbers at the second level of precision.

2. The ray tracing system of claim 1, wherein for a first type of the intersection testing result from the first set of one or more testers, intersection testing does not need to be performed at the second level of precision, and for a second type of the intersection testing result from the first set of one or more testers, intersection testing is to be reperformed at the second level of precision.

3. The ray tracing system of claim 1, wherein the tester module is configured to:
    allocate a ray from a received packet to one of the first set of testers for intersection testing at the first level of precision;
    identify a type of an intersection testing result for the ray provided by said one of the first set of testers to determine whether intersection testing for the ray is to be reperformed at the second level of precision; and
    in response to determining that intersection testing for the ray is to be reperformed at the second level of precision, allocate the ray to one of the second set of testers for intersection testing at the second level of precision.

4. The ray tracing system of claim 2, wherein the first type of the intersection testing result is a miss result, and wherein the second type of the intersection testing result is a hit result.

5. The ray tracing system of claim 2, wherein the first type of the intersection testing result is a hit result, and wherein the second type of the intersection testing result is a miss result.

6. The ray tracing system of claim 2, wherein for a third type of the intersection testing result from the first set of one or more testers intersection testing is not to be reperformed at the second level of precision, wherein the first type is a miss result, the third type is a confident hit result, and the second type is a may be hit result.

7. The ray tracing system of claim 6, wherein each of the first set of testers is configured to determine whether an intersection test is to be reperformed for a hit result based on how close to being a miss result the hit result was.

8. The ray tracing system of claim 7, wherein each of the first set of testers is configured to determine how close to being a miss result a hit result was by determining, for each silhouette edge of the volume, a minimum distance between the ray and the silhouette edge of the volume.

9. The ray tracing system of claim 7, wherein each of the first set of testers is configured to determine how close to being a miss result a hit result was by determining, for each silhouette edge of the volume, a difference in the distances from the ray origin to the two intersection points where the ray intersects with two planes defining that silhouette edge.

10. The ray tracing system of claim 1, wherein the tester module is configured to process the result of the intersection test at the first level of precision if that intersection test does not indicate that the intersection testing is to be reperformed at the second level of precision.

11. The ray tracing system of claim 1, wherein the ray tracing system further comprises a scheduler configured to receive intersection testing results from the tester module and schedule rays into packets for intersection testing with volumes corresponding to nodes of a hierarchical acceleration structure.

12. The ray tracing system of claim 11, wherein the scheduler is configured to:
    if the result of the intersection testing for a ray indicates that the ray intersects a volume corresponding to a parent node in the hierarchical acceleration structure, schedule the ray for intersection testing with one or more volumes corresponding to one or more nodes which are children of the intersected parent node in the hierarchical acceleration structure; and
    if the result of the intersection testing for a ray indicates that the ray does not intersect a volume corresponding to a parent node in the hierarchical acceleration structure, not schedule the ray for intersection testing with one or more volumes corresponding to one or more nodes which are children of the intersected parent node in the hierarchical acceleration structure.

13. The ray tracing system of claim 1, wherein the first set of one or more testers and the second set of one or more testers are configured to perform intersection testing by performing a plurality of edge tests that each determine which side of a respective edge defining part of a silhouette of the volume the ray passes on.

14. A non-transitory computer readable storage medium having stored thereon a computer readable dataset description of a ray tracing that, when processed in an integrated circuit manufacturing system, causes the integrated circuit manufacturing system to manufacture an integrated circuit embodying the ray tracing system as set forth in claim 1.

15. The ray tracing system of claim 1, wherein the tester module is configured to convert floating point numbers from the second level of precision to the first level of precision for use in the first set of one or more testers, wherein converting the floating point numbers comprises rounding the mantissa bits in accordance with rounding modes which are determined such that the intersection testing results provided by the first set of one or more testers are conservative.

16. The ray tracing system of claim 1, further comprising a third set of one or more testers configured to perform intersection testing at a third level of precision, wherein the third level of precision is greater than the second level of precision.

17. A computer-implemented method of performing intersection testing in a ray tracing system, the method comprising, by at least one processor:
performing intersection testing on a ray with a volume at a first level of precision; and
performing further intersection testing on the ray with the volume at a second level of precision greater than the first level of precision, wherein the first and second sets of testers are configured to perform intersection testing using floating point arithmetic, wherein floating point numbers at the first level of precision have fewer mantissa bits and an equal number of exponent bits compared to the floating point numbers at the second level of precision.

18. The method of claim 17, further comprising receiving a packet of one or more rays to test for intersection with the volume and performing said intersection testing at the first level of precision on a ray from the received packet to attempt to determine whether or not the ray intersects the volume.

19. The method of claim 17, further comprising, based on a type of the intersection testing result from said performing intersection testing on the ray at the first level of precision, determining whether intersection testing is to be reperformed for the ray at the second level of precision, wherein said further intersection testing at the second level of precision is performed in response to determining that intersection testing is to be reperformed for the ray at the second level of precision.

* * * * *